(12) United States Patent
Wooten

(10) Patent No.: US 9,396,134 B2
(45) Date of Patent: *Jul. 19, 2016

(54) AUTHORIZATION LOGIC IN MEMORY CONSTRAINED SECURITY DEVICE

(71) Applicant: Microsoft Corporation, Redmond, WA (US)

(72) Inventor: David R. Wooten, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/474,112

(22) Filed: Aug. 30, 2014

(65) Prior Publication Data

US 2014/0373135 A1 Dec. 18, 2014

Related U.S. Application Data

(63) Continuation of application No. 12/821,197, filed on Jun. 23, 2010, now Pat. No. 8,850,562.

(60) Provisional application No. 61/306,945, filed on Feb. 22, 2010.

(51) Int. Cl.
*G06F 12/14* (2006.01)
*G06F 21/00* (2013.01)
(Continued)

(52) U.S. Cl.
CPC ............ *G06F 12/14* (2013.01); *G06F 21/00* (2013.01); *G06F 21/31* (2013.01); *G06F 21/45* (2013.01); *G06F 21/72* (2013.01)

(58) Field of Classification Search
CPC ....................................................... G06F 12/14
USPC ............................................................ 726/21
See application file for complete search history.

(56) References Cited

U.S. PATENT DOCUMENTS

| 2003/0012382 A1 | 1/2003 | Ferchichi et al. |
| 2007/0016766 A1 | 1/2007 | Richmond et al. |
| 2008/0104416 A1 | 5/2008 | Challener et al. |

FOREIGN PATENT DOCUMENTS

EP 2063378 A2 5/2009

OTHER PUBLICATIONS

Maletsky, Kerry., "Designing in a Trusted Platform Module (TPM)", Retrieved at << http://www.trustedcomputinggroup.org/files/resource_files/AC1C4247-1D09-3519-AD37DCA61C968B85/TCG_ESC_Atmel.pdf >>, Sep. 12, 2005.

(Continued)

*Primary Examiner* — Jacob Lipman
(74) *Attorney, Agent, or Firm* — Aneesh Mehta; Sade Fashokun; Micky Minhas

(57) ABSTRACT

Architecture that utilizes logical combinations (e.g., of Boolean logic) of authorizations as a logical authorization expression that is computed through a proofing process to a single proof value which equates to authorizing access to an intended entity. The authorizations are accumulated and processed incrementally according to an evaluation order defined in the authorization expression. The logical combinations can include Boolean operations that evaluate to a proof value associated with a sum of products expression (e.g., combinations of AND, OR, etc.). The incremental evaluations output corresponding hash values as statistically unique identifiers used in a secure hash algorithm that when evaluated in order allow execution of a specific command to access the entity. The architecture, employed in a trust module, uses minimal internal trust module state, and can be employed as part of a device system that handles trust processing to obtain authorization to access the intended entity.

20 Claims, 6 Drawing Sheets

(51) Int. Cl.
  *G06F 21/31*  (2013.01)
  *G06F 21/45*  (2013.01)
  *G06F 21/72*  (2013.01)

(56) References Cited

OTHER PUBLICATIONS

Sarmenta, et al., "Computer Science and Artificial Intelligence Laboratory Technical Report", Retrieved at << http://projects.csail.mit.edu/tc/papers/MIT-CSAIL-TR-2006-064.pdf >>, Technical Report, MIT-CSAIL-TR-2006-064, Sep. 11, 2006.

Cirillo, et al., "Access Control Based on Code Identity for Open Distributed Systems", Retrieved at << http://condor.depaul.edu/~jriely/papers/2007-lhopirat.pdf >>, Proceedings of the 3rd conference on Trustworthy global computing, Nov. 5-6, 2007.

England, et al., "Towards a Programmable TPM", Retrieved at << http://www.springerlink.com/content/h453r87253853734/fulltext.pdf >>, Lecture Notes in Computer Science, vol. 5471, Proceedings of the 2nd International Conference on Trusted Computing, Apr. 6-8, 2009.

Eisenbarth, et al., "Reconfigurable Trusted Computing in Hardware", Retrieved at << http://www.crypto.rub.de/imperia/md/content/texte/publications/conferences/fpga_tpm.pdf >>, Conference on Computer and Communications Security, Proceedings of the 2007 ACM workshop on Scalable trusted computing, Nov. 2, 2007.

"Trusted Mobile Platform", Retrieved at << http://xml.coverpages.org/TMP-HWADv10.pdf >>, Oct. 27, 2004.

AUTHORIZATION LOGIC IN MEMORY CONSTRAINED SECURITY DEVICE

CROSS-REFERENCE TO RELATED APPLICATIONS

This application is a Continuation of co-pending patent application Ser. No. 12/821,197 entitled "AUTHORIZATION LOGIC IN MEMORY CONSTRAINED SECURITY DEVICE", filed Jun. 23, 2010, which claims the benefit of U.S. Provisional Patent application Ser. No. 61/306,945 entitled "AUTHORIZATION LOGIC IN MEMORY CONSTRAINED SECURITY DEVICE", and filed Feb. 22, 2010, the entirety of the aforementioned applications incorporated by reference herein.

BACKGROUND

Trust in many areas of computing has been and will continue to be a desirable feature due to the continual attacks on hardware and software systems to gain access to user information, financial information, system control, and any other goal of the unauthorized attack.

Given that in the computing world, rarely are the parties to a transaction in direct face-to-face contact, it then becomes important to establish some level of trust in the other party. Existing technologies include the use of public and private keys, certificate authorities, and so on.

There are different levels and types of trust. The expectation of a behavior does not apply to all things equally as expectations of an individual depend on the identity of the individual and the role that the individual is being expected to serve. For example, one party might trust a banker to oversee a bank and savings but not children; while the party might trust a relative to look after the children, but not the bank account.

When performing online banking, it is especially important to know that the transaction is with a bank computer rather than the computer of a thief. If it is determined the connection is with a thief, the thief will not indicate they are a thief; thus, the object is to ensure that the transaction is being handled by the bank's computer.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

The disclosed architecture facilitates the utilization of arbitrary logical combinations of authorization values in a sum of products, for example, as a logical expression of authorizations that is computed through a proofing process to a single proof value which equates to authorizing access to an intended entity. The architecture, employed as part of a trust module, uses minimal internal trust module state. The trust module (e.g., hardware, software, and hardware/software) can be employed as part of a device system that handles trust processing to obtain authorization to access the intended entity (e.g., hardware, software, etc.).

When access to an entity with the trust module is desired, the trust module is guided through an authorization proof defined as a sequence of checks that must be performed according to the logical expression of the required authorizations. Incremental checks made as part of processing of the authorizations by the trust module produce a statistically unique value that is characteristic of the authorization processed. If the trust module successfully walks through the proofing process according to a predetermined order defined in the logical expression, then a digest is computed that is the final result of all hash values. The digest is compared to a proof value where a favorable comparison allows access to the entity.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
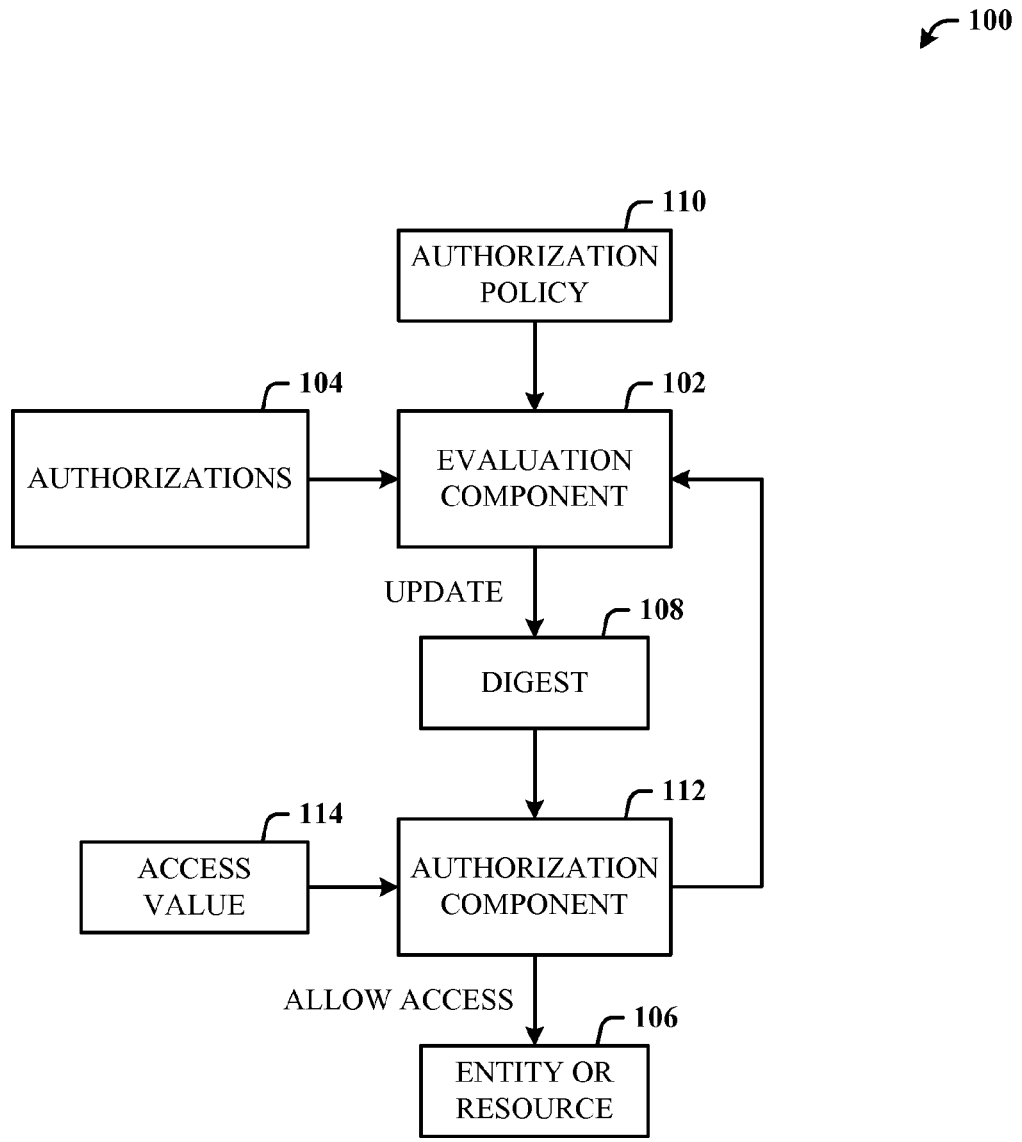
FIG. 1 illustrates an authorization system in accordance with the disclosed architecture.

Trust in many areas of computing has been and will continue to be an important characteristic due to the continual attacks on hardware and software systems to gain access to user information, financial information, system control, and any goal of the unauthorized attack. Technologies are being developed and employed where trust is now transformed into a digital process that prevents or at least impedes the ability of any user to spoof the system or other systems to gain unauthorized access at the instruction level and even at the chip level.

One example technology is trusted platform module (TPM). A TPM can be employed in a system to authenticate hardware or software, and between systems using the same components. For example, a smartcard-like TPM can be sited on a system motherboard to perform cryptographic functions (e.g., RSA, SHA-1, RNG), protect secrets, provide a cryptographically-verifiable identity, create, "store," and manage keys, perform digital signature operations, hold platform measurements (e.g., in a platform configuration register (PCR)), protect itself against attacks, and serve as the anchor in the chain of trust for keys and credentials.

The disclosed architecture facilitates enhanced authorization for trust in computing environments. Asymmetric authorizations are now allowed to augment the symmetric authorizations (e.g., in HMAC-hash-based message authentication code) with asymmetric authorizations. Thus, arbitrary logical constructions of authorization expressions are now allowed.

The architecture represents the software and hardware state of a system by hashing values into a state storage location (SSL) (e.g., similar to a PCR in TPM architecture). The SSL contains a summary of all the measured values and the order in which the measured values occurred. SSL values are temporal and are reset at system reboot. SSLs may be implemented in volatile or non-volatile storage, and are protected from software attack. SSL values may be digitally signed with a trust module key in order to authenticate. The key used for signing has been previously validated as belonging to a specific trust module.

When the use of a key is gated by the SSL, the current values in a storage location hash can be checked against a value that was put in the key when created. In a similar way, the state of an authorization sequence can be represented by hashing authorization values in to an authorization policy. When the use of a key is gated by a policy, a check can be made that the current value of the policy matches a value that was put in the key when it was created. The architecture ensures that the policy cannot be the required value unless the required authorizations have been given to the trust module. Since the policy is represented by a digest, the policy can have an unlimited number of terms/authorizations.

The disclosed architecture includes authorization logic that authorizes access to an entity (object) based on successful (and optionally, incremental) processing of an authorization expression. The authorization logic determines if an action (e.g., command) can be performed on the entity. The actions can include using a key (e.g., to sign an email document, full disk encryption, etc.), migrating or backing up a key (e.g., in a datacenter or to move a users state from one machine to another) and various other operations. A command or action is functionality that is exposed external to the trust module and can be associated with a numeric value (a derived proof value) that represents its functionality.

Example applications include using a key of a fingerprint reader that indicates OK in combination with (logical AND) a Password, the logical expression of OK AND Password is correct. Thus, authorization is allowed.

In another example, a key can be revealed that allows a hard disk to be decrypted based on evaluation of a logical expression to a final value (proof value), the expression defined as "if a register is correctly set" OR "if a certificate is provided that indicates that another register value is good" OR "if a recovery password is provided".

In one example, the final value can ultimately be evaluated such that the system outputs a logical true or a logical false; however, when employing hash functions, the proof value can be numeric. The authorization logic evaluates the logical expression by way of hash values. When the hash values of all interim operations, as being checked during the evaluation process, ultimately result in a final digest (proof value) associated with authorized access, the entity is exposed for access. Thus, interim authorization hashes are associated with corresponding entity/actions to be authorized.

As indicated, the creation of a sequence of operations (e.g., logical sum of products) can be represented as an authorization expression (or request) that evaluates in a predetermined evaluation order to a value which allows the desired access. The logical expression can be designed based on the existing system, and then evaluated according to yet other evaluation algorithms that evaluate the operations in different ways. For example, rather than test the operations of the expression at each step, checks can be "batch" processed at fixed intervals, such as at every second operation, or every third operation, etc., and/or irregular intervals, to output the interim value at that step. The design and evaluation of the logical expressions can also be applied to licensing, for example, to enable/disable hardware and/or software.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives falling within the spirit and scope of the claimed subject matter.

FIG. 1 illustrates an authorization system 100 in accordance with the disclosed architecture. The system 100 includes an evaluation component 102 that receives authorizations 104 in response to requests for access to an entity (or resource) 106. The collection of the authorizations 104 in the correct order is called a policy. The evaluation component 102 outputs a digest 108 during incremental evaluation of the authorizations 104 according to a predetermined authorization policy 110. An authorization component 112 grants the access to the entity 106 when the digest 108 matches an access value 114 associated with authorization of access to the entity 106. The access can be a command and the entity can be a trust module that manages access to key stores and secured keys.

The evaluation component 102 employs a secure hash algorithm to create and update the digest 108. The authorization policy 110 includes a logical authorization expression against which the authorizations 104 are evaluated. The logical authorization expression includes a logical AND operator, a logical OR operator, or a combination of AND and OR operators.

The expression is a sequence of Boolean operations that if evaluate true further result in evaluation of the digest 108. The authorizations 104 include symmetrical authorizations and asymmetrically signed authorizations. The evaluation component 102 determines that an authorization is properly signed with symmetric signing, and extends the digest 108 with the symmetric signing. The extend process is an operation that replaces the current value of a parameters with the hash of a buffer constructed by concatenation of the new value to the current value of the parameter. Updating the SSL is referred to as extending, since the SSL contains the digest value (also referred as proof value) that updated (replaced) during evaluation.

The authorizations 104 include an authorization that comprises qualifying data to differentiate the authorization from other authorizations. The evaluation component 102 and authorization component 112 are part of a trust module. The trust module is allowed to execute a command to obtain the access to the entity or resource 106 upon successful evaluation of the authorizations 104 according to a hash algorithm.

Figure 2:
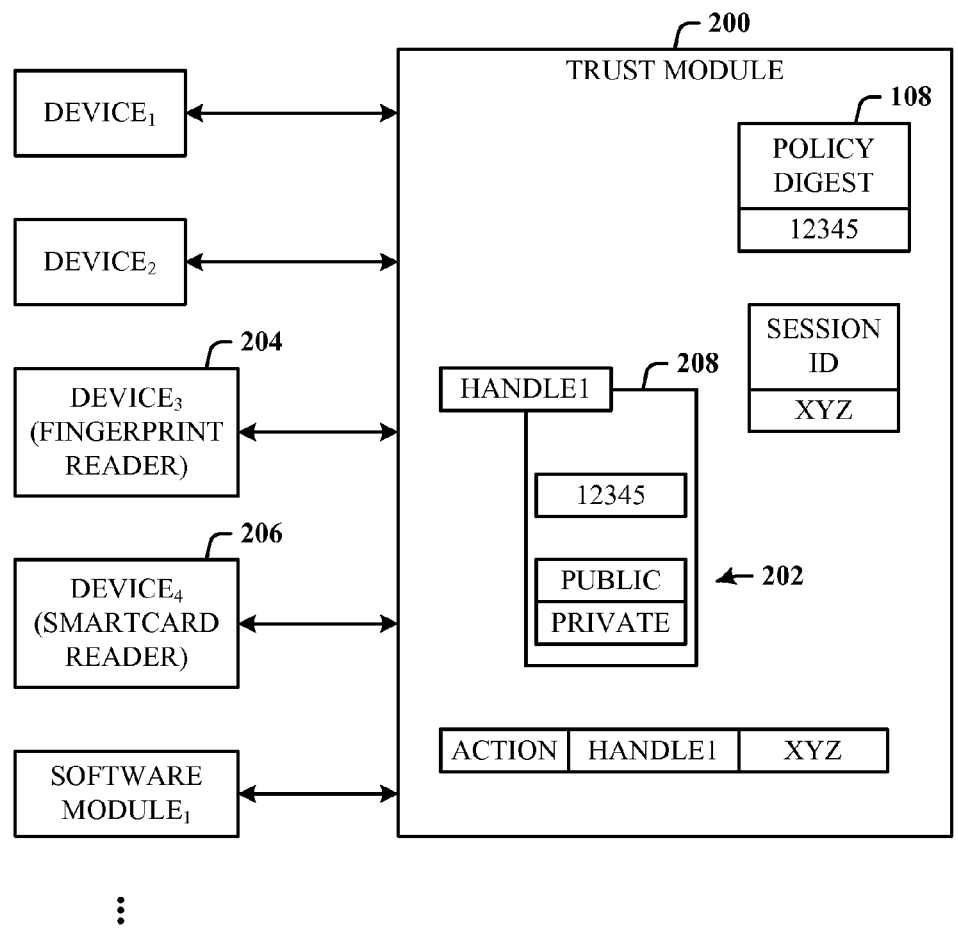
FIG. 2 illustrates a trust module that employs enhanced authorization using policy authorizations.

FIG. 2 illustrates a trust module 200 that employs enhanced authorization using policy authorizations. The trust module 200 implements encryption and decryption cryptographic operations internally. The module employs cryptographic operations that include the following asymmetric encryption and decryption, asymmetric signing and signature verification, symmetric encryption and decryption, symmetric signing (e.g., HMAC) and signature verification, and key generation. A key generation module of the trust module creates asymmetric key pairs and symmetric keys. The key generation module produces two different types of keys: an ordinary key that is produced using the RNG (random number generator) to seed the computation (the results of which produce a secret key value that will be kept in a secure location), and a root key that is derived from a seed value rather than the RNG.

An authorization policy is expressed as an ordered sequence of individual authorizations combined in a way that is analogous to logical operations (AND and OR) but performed with hashes.

Policy authorization statements are presented to the trust module 200 in a structured way. The trust module 200 evaluates the authorizations and creates a hash (policyHash) that is characteristic of the authorizations it has processed. When a command is executed using a policy for authorization, the policyHash will be compared to the policyAuth in an object to validate that the proper authorizations for that object have been provided. If the necessary authorizations are not provided in the proper order, the policyHash will not match the policyAuth.

An authorization statement provides evidence that an identified entity is giving authorization. Examples of the types of statements are: authorization is given by the holder of a private asymmetric key, and authorization is given by an entity that knows a secret. Additional policy commands can be used to qualify the environment for an authorization or to limit the scope of an authorization to a specific command. Other policy commands allow construction of a migration policy and provide a means of having flexible policies.

For policy commands in which an authorization is provided, the name of the object associated with the authorization will added to the policy hash.

policyHash$_{new}$:=hash(policyHash$_{old}$||Name$_{auth}$)

If the authorizing entity chooses, it may qualify the authorization to limit the scope of the authorizations. Those qualifications can be included either in the policyHash or be stored in the context of the policy session.

A sequence of policy commands, each providing an authorization or qualification can provide a simple "AND" policy (all of the policies need to be valid). However, many useful constructs require the ability to allow an OR; such as when an object is to be usable by different people with different secrets.

The following definitions apply herein. The public portion of a key pair 202 is denoted PB, the private portion of a key pair is denoted PR, a public or private key belonging to some identified entity is denoted as PB$_x$ and PR$_x$, an HMAC of M using "key" is denoted as HMAC$_{key}$(M), a secure hash of M is denoted hash (M), a concatenation of B to A is denoted A||B, and, qualifying data produced by "x" to identity "y" is denoted QD$_{x(y)}$.

The architecture enables symmetric and asymmetric authorization, represented by HMAC$_{authvalue}$ (authorized) for symmetric signature (HMAC) for authorization, and sign$_{PR}$ (authorized) for asymmetric signing for authorization. Evaluation of an asymmetric authorization using a public key loaded into trust module 200 is represented as signatureCheck$_{PB}$ (sign$_{PR}$ (authorized)).

With respect to authorization evaluation, when the trust module 200 determines that an authorization is properly signed, the module 200 extends the policy digest 108 with the public key that was used to confirm the authorization, represented as:

TMdigest$_{new}$:=hash (TMdigest$_{old}$||PB)

The trust module 200 evaluates authorizations, one at a time, and accumulates the digest 108 of all the authorization providers.

With respect to qualified authorization, it can be desirable to use the same signing key to provide an authorization, but yet need to differentiate the authorizations. For example, consider that a fingerprint reader 204 has a single signing key to identify the fingerprint reader 204, but it is desirable to differentiate fingerprints for multiple users ("Is it Bob's fingerprint or Jing's fingerprint?").

This can be provided by employing qualifying data (QD) in the signed data. Consider that fingerprint reader 204 provides authorization by, sign$_{PRFP}$(authorized||QD$_{FP}$)

If the signature check succeeds, then the digest operation becomes:

TMdigest$_{new}$:=hash(TMdigest$_{old}$||PB$_{FP}$||QD$_{FP}$)

which includes qualifying data specific to the authorizing entity.

Following are examples that describe computation of a policy hash (of a simple policy), include the policy in a trust module key, has the trust module 200 evaluate the policy, and then use the policy to authorize use of a key.

A first example computes a policy hash. Consider a desired authorization policy (authPolicy), (fingerprint="Jing")

Data is gathered that includes a public key (PB$_{FP}$) of the fingerprint reader 204 and a value that indicates the fingerprint reader 204 recognizes Jing (QD$_{FP(Jing)}$).

External to the trust module 200, the unique digest of this policy is computed:

1) digest$_0$=0
2) digest$_1$=hash(digest$_0$||PB$_{FP}$||QD$_{FP(Jing)}$) (assume that digest$_1$ has a value of 12345)

Continuing with the examples, the second example illustrates the use of the policy in a trust module key. A description of the key to generate is created, and includes the digest of the desired policy (authPolicy). The trust module 200 creates a new public/private key pair, binds the pair pieces with a hash, encrypts the private portion of the key and the binding hash, and returns the created key.

In the third example, which evaluates the policy, the trust module 200 is instructed to start a policy session. The trust module 200 initializes its policy digest, creates a session identifier (ID), and returns the session ID to a caller. In this description, the session ID is returned to the fingerprint reader 204. The reader 204 recognizes Jing and, signs the session ID and qualifying data QD$_{Jing}$, as follows:

sign$_{PR_{FP}}$(xyz||QD$_{FP(Jing)}$)

With respect to evaluating the policy, in the third example, the public key of the fingerprint reader 204 is loaded, the signature sent, and since the signature checks, the policy digest 108 is updated.

In the fourth example of using the key with the policy, the key to be used is then loaded, the trust module 200 decrypts the key, checks the hash, assigns a handle (HANDLE1), and returns the handle to the caller. A command is then created using the handle of the loaded key and the policy session ID. Trust module resources are referenced by handles. Each handle uniquely identifies a resource that occupies trust module memory. A session is assigned a handle when the session is created.

Next, the key with the handle in the command is found, and the policy session with the ID in the command is found. A check is then performed to determine if the policy digest 108 matches the authPolicy in the key. Since the digest matches, the action is approved.

Following is a description that extends the number of authorizations that can be included in a policy.

The authorization process can be extended to using any number of authorizations, such as in the following logical AND example:

(fingerprint=Bob) AND (smartcard=Bob) AND . . .

Compute the digest of consecutive authorizations:
1) $digest_1:=hash(0\|PB_{FP}\|QD_{FP(Bob)})$
2) $digest_2:=hash(digest_1\|PB_{SC}\|QD_{SC(Bob)})$ (insert $digest_2$ in the key when created)

When the trust module 200 is given the authorization from the fingerprint reader 204, followed by the authorization from a smartcard reader 206, the trust module 200 will have computed $digest_2$ and can then authorized use of the key.

The authorization process can be extended using any number of mixed Boolean authorizations, such as in the following logical AND plus OR example:

(fingerprint==Bob) AND (smartcard==Bob)
OR
(fingerprint==Jing) AND (smartcard==Jing)

The digest computed for Bob is,
1) $digest_{1Bob}:=hash(0\|PB_{FP}\|QD_{FP(Bob)})$
2) $digest_{2Bob}:=hash(digest_{1Bob}\|PB_{SC}\|QD_{SC(Bob)})$ The digest computed for Jing is,
3) $digest_{1Jing}:=hash(0\|PB_{FP}\|QD_{FP(Jing)})$
4) $digest_{2Jing}:=hash(digest_{1Jing}\|PB_{SC}\|QD_{SC(Jing)})$ The two digests are hashed and the results inserted into the created key,
5) $digest_3:=hash(digest_{2Bob}\|digest_{2Jing}) \rightarrow authPolicy$ The policy logic for OR evaluation can be the following. The trust module (TM) 200 processes authorizations from the fingerprint reader 204 and the smartcard reader 206 to obtain, $TMdigest=digest_{2Jing}$ The trust module 200 is given a list of digests (in this case the list is only two):

$(digest_{2Bob}, digest_{2Jing})$

The trust module 200 checks to determine if TMdigest matches a value in the list. If a match is found, the module 200 replaces TMdigest with the hash of the entire list:

$TMdigest:=hash(digest_{2Bob}\|digest_{2Jing})=digest_3$

Note that the result of the OR operation would have been the same if authorizations had been collected from Bob.

With respect to policy signing, a policy can be signed like any other authorization.

$sign_{PR_{authority}}(approvedPolicyHash\|QD_{authority})$

A command (e.g., "approve") can be used to tell the trust module 200 to check that the current TMdigest value is equal to approvedPolicyHash. If so, the trust module 200 replaces TMdigest with:

$TMdigest:=hash(PB_{authority}\|QD_{authority})$

The new digest value is not dependent on approvedPolicyHash.

With respect to state storage location (SSL) 208 (e.g., similar to a PCR in the TPM architecture) in a policy, a command is created that evaluates the SSL. The state of the software and/or hardware of a system is characterized by hashing values into the SSL 208. The command contains a selection of (e.g., SSLselect, or PCRselect in the context of TPM) and the expected hash of all of the selected SSL (e.g., SSLdigest, or PCRdigest in the context of TPM). If the SSLs match the value in the command, the TMdigest is extended, such as in the following:

$TMdigest_{N+1}:=hash(TMdigest_N\|SSLselect\|SSLdigest)$

This can be compared against authPolicy in the key so that authorization is only valid if the SSL has the desired values.

The SSL checking can be combined with other authorizations for more interesting authorizations, such as the following:

(SSL==stateA) AND (fingerprint==Bob)
OR
(SSL==stateB) AND (fingerprint==Jing)

Following is an example application of policy signing of the disclosed architecture. An OEM (original equipment manufacturer) has a BIOS (basic input/output system) that causes a register SSL[0] to have value A, the OEM creates, $X:=hash(0\|SSLselect\|A)$
$sign_{PR_{OEM}}(X\|QD_{OEM})$ (1)

A party that trusts the OEM to indicate a good value for SSL[0] can create a policy that includes a term:

approve $(hash(PB_{OEM}\|QD_{OEM}))$

Thereafter, when the OEM creates a new BIOS that causes SSL[0] to have a value of B, the OEM sends out a new signature, $Y:=hash(0\|SSLselect\|B)$
$sign_{PR_{OEM}}(Y\|QD_{OEM})$ (2)

The new BIOS can be used without breaking policies, since both (1) and (2) produce the same TMdigest, $TMdigest:=hash(PB_{OEM}\|QD_{OEM})$ Other policy types and variations can include ordinals where authorization is only valid for a specific ordinal, authorization is good for x seconds, authorization is only good for a specific command with specific parameters, etc.

Put another way, an authorization system is provided that comprise an evaluation component that receives authorizations in response to a request for access to an entity and outputs a digest during evaluation of the authorizations according to an authorization policy, the evaluation component utilizes a secure hash algorithm to create and updates the digest based on processing of a logical authorization expression of the authorization policy, and an authorization component that grants the access to the entity when the digest matches an access value associated with authorization of access to the entity.

The logical authorization expression includes at least one of logical AND or logical OR operators. The access value matches a command value associated with a command that allows access to the entity. The authorizations include symmetrical authorizations and asymmetrically signed authorizations. The evaluation component determines that an authorization is properly signed with symmetric signing, and extends the digest with the symmetric signing.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 3:
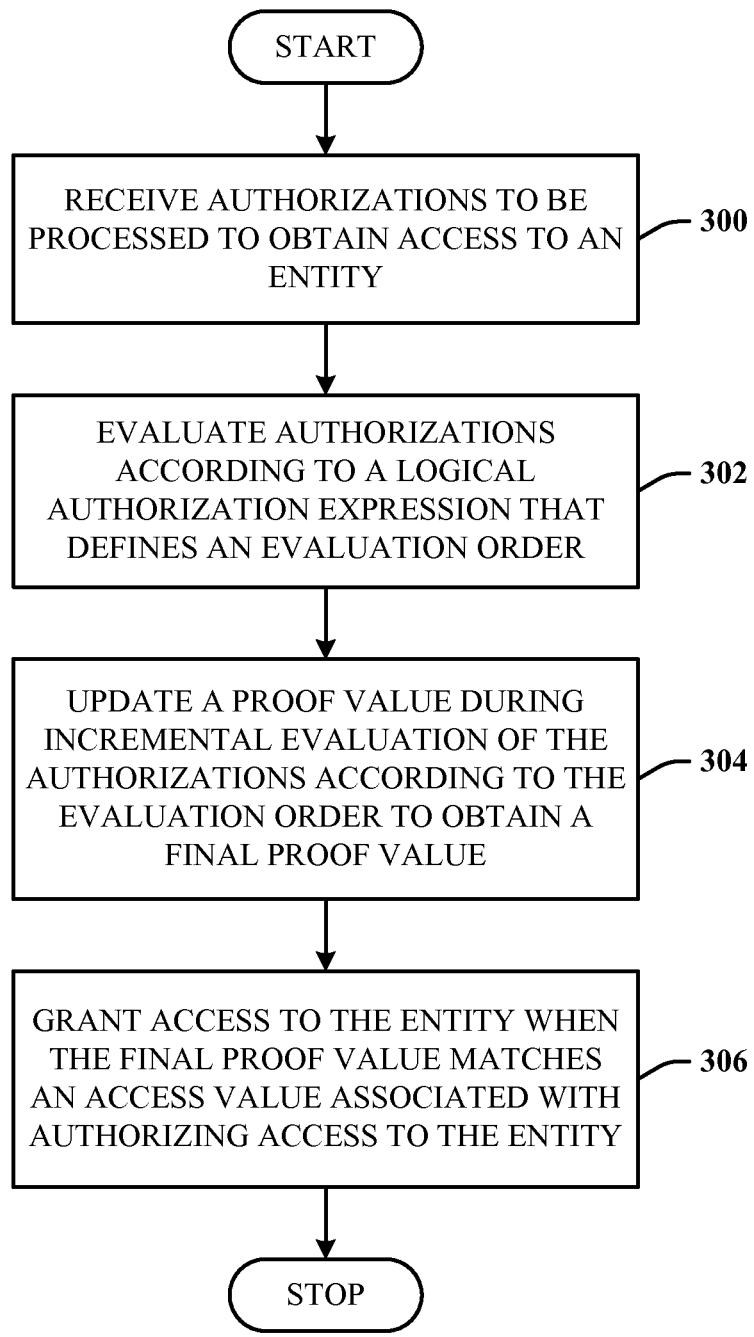
FIG. 3 illustrates an authorization method in accordance with the disclosed architecture.

FIG. 3 illustrates an authorization method in accordance with the disclosed architecture. At 300, authorizations are received to be processed to obtain access to an entity. At 302, the authorizations are evaluated according to a logical authorization expression that defines a predetermined evaluation order. At 304, a proof value is updated during incremental evaluation of the authorizations according to the predetermined evaluation order to obtain a final proof value. At 306, the access to the entity is granted when the final proof value matches an access value associated with authorizing access to the entity.

Figure 4:
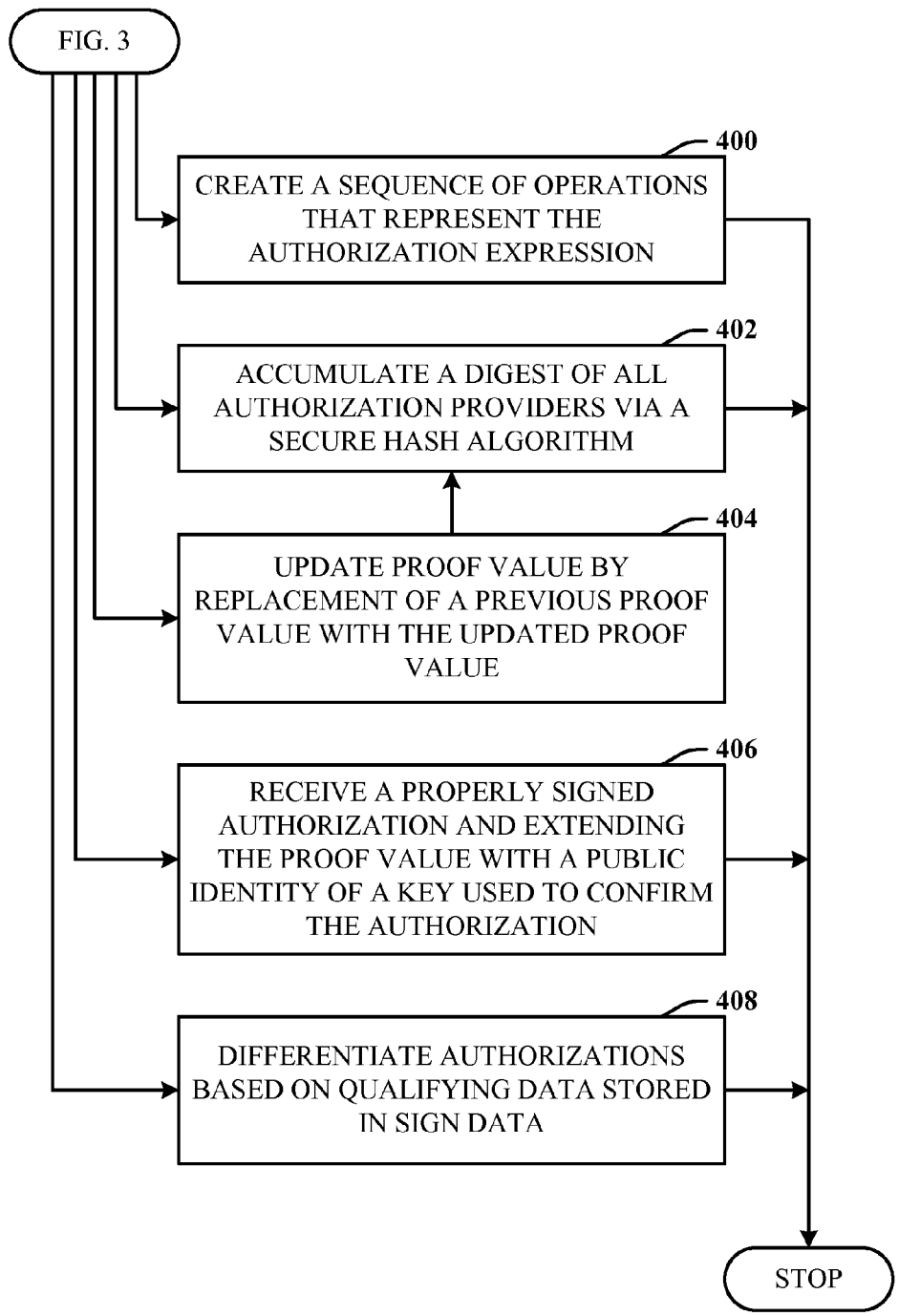
FIG. 4 illustrates additional aspects of the method of FIG. 3.

FIG. 4 illustrates additional aspects of the method of FIG. 3. Note that the arrowing indicates that each block represents a step that can be included, separately or in combination with other blocks, as additional aspects of the method represented by the flow chart of FIG. 3. At 400, a sequence of operations is created that represents the authorization expression. At 402, a digest of all authorization providers is accumulated via a secure hash algorithm. At 404, the proof value is updated by replacement of a previous proof value with the updated proof value. At 406, a properly signed authorization is received and the proof value extended with a public identity of a key used to confirm the authorization. Sometimes, evaluation can be via a secret key (not a public key). When the evaluation is valid, the unique identity that is associated with the secret value is extended. With an asymmetric key, this corresponds to its public key. With an asymmetric secret, it is a unique, public identity that the trust module creates to unambiguously identify the proper use of the secret. In other words, the trust module checks that the signature was generated by something that had access to the secret value associated with this public identity. With asymmetric keys, the secret value is the private key. With symmetric keys, the secret value is an HMAC key. With asymmetric keys, there is a natural way of assigning a public identity for the key. At 408, authorizations are differentiated based on qualifying data stored in sign data.

As used in this application, the terms "component" and "system" are intended to refer to a computer-related entity, either hardware, a combination of software and tangible hardware, software, or software in execution. For example, a component can be, but is not limited to, tangible components such as a processor, chip memory, mass storage devices (e.g., optical drives, solid state drives, and/or magnetic storage media drives), and computers, and software components such as a process running on a processor, an object, an executable, module, a thread of execution, and/or a program. By way of illustration, both an application running on a server and the server can be a component. One or more components can reside within a process and/or thread of execution, and a component can be localized on one computer and/or distributed between two or more computers. The word "exemplary" may be used herein to mean serving as an example, instance, or illustration. Any aspect or design described herein as "exemplary" is not necessarily to be construed as preferred or advantageous over other aspects or designs.

Figure 5:
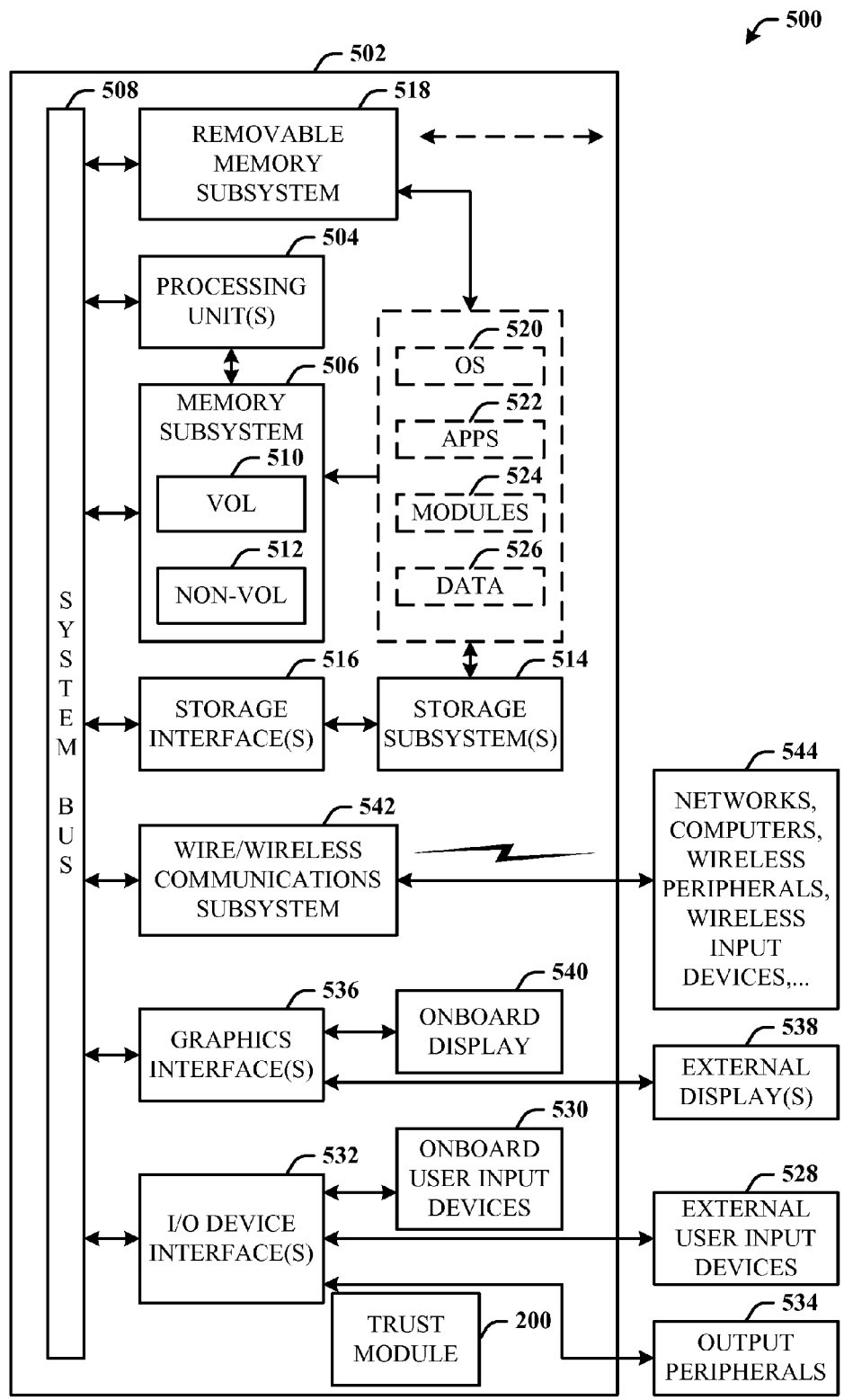
FIG. 5 illustrates a block diagram of a computing system that executes authorization logic in accordance with the disclosed architecture.

Referring now to FIG. 5, there is illustrated a block diagram of a computing system 500 that executes Boolean authorization logic in accordance with the disclosed architecture. In order to provide additional context for various aspects thereof, FIG. 5 and the following description are intended to provide a brief, general description of the suitable computing system 500 in which the various aspects can be implemented. While the description above is in the general context of computer-executable instructions that can run on one or more computers, those skilled in the art will recognize that a novel embodiment also can be implemented in combination with other program modules and/or as a combination of hardware and software.

The computing system 500 for implementing various aspects includes the computer 502 having processing unit(s) 504, a computer-readable storage such as a system memory 506, and a system bus 508. The processing unit(s) 504 can be any of various commercially available processors such as single-processor, multi-processor, single-core units and multi-core units. Moreover, those skilled in the art will appreciate that the novel methods can be practiced with other computer system configurations, including minicomputers, mainframe computers, as well as personal computers (e.g., desktop, laptop, etc.), hand-held computing devices, microprocessor-based or programmable consumer electronics, and the like, each of which can be operatively coupled to one or more associated devices.

The system memory 506 can include computer-readable storage (physical storage media) such as a volatile (VOL) memory 510 (e.g., random access memory (RAM)) and non-volatile memory (NON-VOL) 512 (e.g., ROM, EPROM, EEPROM, etc.). A basic input/output system (BIOS) can be stored in the non-volatile memory 512, and includes the basic routines that facilitate the communication of data and signals between components within the computer 502, such as during startup. The volatile memory 510 can also include a high-speed RAM such as static RAM for caching data.

The system bus 508 provides an interface for system components including, but not limited to, the system memory 506 to the processing unit(s) 504. The system bus 508 can be any of several types of bus structure that can further interconnect to a memory bus (with or without a memory controller), and a peripheral bus (e.g., PCI, PCIe, AGP, LPC, etc.), using any of a variety of commercially available bus architectures.

The computer 502 further includes machine readable storage subsystem(s) 514 and storage interface(s) 516 for interfacing the storage subsystem(s) 514 to the system bus 508 and other desired computer components. The storage subsystem(s) 514 (physical storage media) can include one or more of a hard disk drive (HDD), a magnetic floppy disk drive (FDD), and/or optical disk storage drive (e.g., a CD-ROM drive DVD drive), for example. The storage interface(s) 516 can include interface technologies such as EIDE, ATA, SATA, and IEEE 1394, for example.

One or more programs and data can be stored in the memory subsystem 506, a machine readable and removable memory subsystem 518 (e.g., flash drive form factor technology), and/or the storage subsystem(s) 514 (e.g., optical, magnetic, solid state), including an operating system 520, one or more application programs 522, other program modules 524, and program data 526.

The trust module 200 can be located in the computer system 502. Accordingly, the trust module 200 and/or computer 502 can include entities and components of the system 100 of FIG. 1, entities and components of the trust module 200 of FIG. 2, and methods represented by the flowcharts of FIGS. 3-5, for example.

Generally, programs include routines, methods, data structures, other software components, etc., that perform particular tasks or implement particular abstract data types. All or portions of the operating system 520, applications 522, modules 524, and/or data 526 can also be cached in memory such as the volatile memory 510, for example. It is to be appreciated that the disclosed architecture can be implemented with various commercially available operating systems or combinations of operating systems (e.g., as virtual machines).

The storage subsystem(s) 514 and memory subsystems (506 and 518) serve as computer readable media for volatile and non-volatile storage of data, data structures, computer-executable instructions, and so forth. Such instructions, when executed by a computer or other machine, can cause the computer or other machine to perform one or more acts of a method. The instructions to perform the acts can be stored on one medium, or could be stored across multiple media, so that the instructions appear collectively on the one or more computer-readable storage media, regardless of whether all of the instructions are on the same media.

Computer readable media can be any available media that can be accessed by the computer 502 and includes volatile and non-volatile internal and/or external media that is removable or non-removable. For the computer 502, the media accommodate the storage of data in any suitable digital format. It should be appreciated by those skilled in the art that other types of computer readable media can be employed such as zip drives, magnetic tape, flash memory cards, flash drives, cartridges, and the like, for storing computer executable instructions for performing the novel methods of the disclosed architecture.

A user can interact with the computer 502, programs, and data using external user input devices 528 such as a keyboard and a mouse. Other external user input devices 528 can include a microphone, an IR (infrared) remote control, a joystick, a game pad, camera recognition systems, a stylus pen, touch screen, gesture systems (e.g., eye movement, head movement, etc.), and/or the like. The user can interact with the computer 502, programs, and data using onboard user input devices 530 such a touchpad, microphone, keyboard, etc., where the computer 502 is a portable computer, for example. These and other input devices are connected to the processing unit(s) 504 through input/output (I/O) device interface(s) 532 via the system bus 508, but can be connected by other interfaces such as a parallel port, IEEE 1394 serial port, a game port, a USB port, an IR interface, short-range wireless (e.g., Bluetooth) and other personal area network (PAN) technologies, etc. The I/O device interface(s) 532 also facilitate the use of output peripherals 534 such as printers, audio devices, camera devices, and so on, such as a sound card and/or onboard audio processing capability.

One or more graphics interface(s) 536 (also commonly referred to as a graphics processing unit (GPU)) provide graphics and video signals between the computer 502 and external display(s) 538 (e.g., LCD, plasma) and/or onboard displays 540 (e.g., for portable computer). The graphics interface(s) 536 can also be manufactured as part of the computer system board.

The computer 502 can operate in a networked environment (e.g., IP-based) using logical connections via a wired/wireless communications subsystem 542 to one or more networks and/or other computers. The other computers can include workstations, servers, routers, personal computers, microprocessor-based entertainment appliances, peer devices or other common network nodes, and typically include many or all of the elements described relative to the computer 502. The logical connections can include wired/wireless connectivity to a local area network (LAN), a wide area network (WAN), hotspot, and so on. LAN and WAN networking environments are commonplace in offices and companies and facilitate enterprise-wide computer networks, such as intranets, all of which may connect to a global communications network such as the Internet.

When used in a networking environment the computer 502 connects to the network via a wired/wireless communication subsystem 542 (e.g., a network interface adapter, onboard transceiver subsystem, etc.) to communicate with wired/wireless networks, wired/wireless printers, wired/wireless input devices 544, and so on. The computer 502 can include a modem or other means for establishing communications over the network. In a networked environment, programs and data relative to the computer 502 can be stored in the remote memory/storage device, as is associated with a distributed system. It will be appreciated that the network connections shown are exemplary and other means of establishing a communications link between the computers can be used.

The computer 502 is operable to communicate with wired/wireless devices or entities using the radio technologies such as the IEEE 802.xx family of standards, such as wireless devices operatively disposed in wireless communication (e.g., IEEE 802.11 over-the-air modulation techniques) with, for example, a printer, scanner, desktop and/or portable computer, personal digital assistant (PDA), communications satellite, any piece of equipment or location associated with a wirelessly detectable tag (e.g., a kiosk, news stand, restroom), and telephone. This includes at least Wi-Fi (or Wireless Fidelity) for hotspots, WiMax, and Bluetooth™ wireless technologies. Thus, the communications can be a predefined structure as with a conventional network or simply an ad hoc communication between at least two devices. Wi-Fi networks use radio technologies called IEEE 802.11x (a, b, g, etc.) to provide secure, reliable, fast wireless connectivity. A Wi-Fi network can be used to connect computers to each other, to the Internet, and to wire networks (which use IEEE 802.3-related media and functions).

Figure 6:
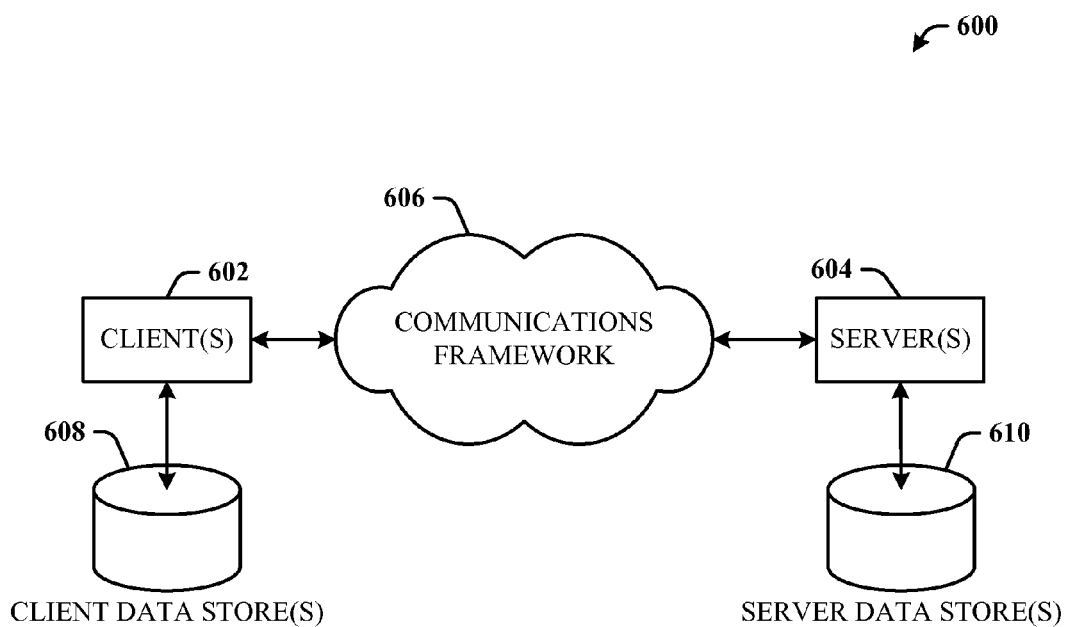
FIG. 6 illustrates a schematic block diagram of a computing environment that utilizes authorization logic in accordance with the disclosed architecture.

Referring now to FIG. 6, there is illustrated a schematic block diagram of a computing environment 600 that utilizes trust authorization according to the disclosed architecture. The environment 600 includes one or more client(s) 602. The client(s) 602 can be hardware and/or software (e.g., threads, processes, computing devices). The client(s) 602 can house cookie(s) and/or associated contextual information, for example.

The environment 600 also includes one or more server(s) 604. The server(s) 604 can also be hardware and/or software (e.g., threads, processes, computing devices). The servers 604 can house threads to perform transformations by employing the architecture, for example. One possible communication between a client 602 and a server 604 can be in the form of a data packet adapted to be transmitted between two or more computer processes. The data packet may include a cookie and/or associated contextual information, for example. The environment 600 includes a communication framework 606 (e.g., a global communication network such as the Internet) that can be employed to facilitate communications between the client(s) 602 and the server(s) 604.

Communications can be facilitated via a wire (including optical fiber) and/or wireless technology. The client(s) 602 are operatively connected to one or more client data store(s) 608 that can be employed to store information local to the client(s) 602 (e.g., cookie(s) and/or associated contextual information). Similarly, the server(s) 604 are operatively connected to one or more server data store(s) 610 that can be employed to store information local to the servers 604.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An authorization system, comprising:
 a trust module configured to receive authorizations from a device or a software module for access to a hardware or software resource, the trust module comprising:
 an evaluation component configured to receive the authorizations and apply the authorizations against an authorization policy in response to a request for access to the hardware resource or the software resource, the authorization policy defines an ordered sequence of the authorizations and includes a logical authorization expression that logically combines the individual authorizations with at least one logical operator, the evaluation component configured to output a policy digest that represents authorization values of the ordered sequence in a logical combination with the at least one logical operator; and an authorization component configured to grant the device the access to the hardware resource or the software resource when the policy digest matches an access value associated with authorization of access to the hardware resource or the software resource.

2. The system of claim 1, wherein the evaluation component employs a secure hash algorithm to create and update the digest.

3. The system of claim 1, wherein the logical authorization expression defines a predetermined evaluation order against which the authorizations are evaluated.

4. The system of claim 1, wherein the at least one logical operator of the logical authorization expression includes at least one of a logical AND operator or a logical OR operator.

5. The system of claim 1, wherein the logical authorization expression is a sequence of Boolean operations that if evaluate true further result in evaluation of the digest.

6. The system of claim 1, wherein the authorizations include symmetrical authorizations and asymmetrically signed authorizations.

7. The system of claim 1, wherein the evaluation component determines that an authorization is properly signed with symmetric signing, and extends the digest with the symmetric signing.

8. The system of claim 1, wherein the authorizations include an authorization that comprises qualifying data to differentiate the authorization from other authorizations.

9. The system of claim 1, wherein the trust module is configured to execute a command to obtain the access to the hardware resource or the software resource upon successful evaluation of the authorizations according to a hash algorithm.

10. An authorization system, comprising:
at least one microprocessor configured to process data; and
a data storage device configured to store instructions, which upon execution by the least one microprocessor, control the authorization system to perform acts of:
receiving an authorization policy that defines a sequence of individual authorizations and includes an authorization expression that combines the individual authorizations using at least one operator;
evaluating the sequence of individual authorizations according to the authorization expression as part of enabling access to an entity;
updating a proof value during evaluation of the authorizations according to an evaluation order to obtain a final proof value; and
granting the access to the entity when the final proof value matches an access value associated with authorizing access to the entity.

11. The system of claim 10, wherein the at least one operator of the authorization expression includes a logical AND and a logical OR operator.

12. The system of claim 10, wherein the access value matches a command value associated with a command that enables access to the entity.

13. The system of claim 10, wherein the authorizations include symmetrical authorizations and asymmetrically signed authorizations.

14. The system of claim 10, further comprising determining that an authorization is properly signed with symmetric signing, and extends the digest with the symmetric signing.

15. A computer-implemented authorization method, comprising acts of:
as part of receiving a request from a hardware entity or a software entity to access a hardware resource or a software resource, evaluating a sequence of individual authorizations, the sequence defined by an authorization expression that combines the individual authorizations using at least one operator;
cumulatively updating a proof value during evaluation of the individual authorizations to obtain a final proof value; and
granting the access to the hardware resource or the software resource by the hardware entity or the software entity when the final proof value matches an access value associated with authorizing access to the hardware resource or the software resource.

16. The method of claim 15, further comprising creating a sequence of operations that represent the authorization expression.

17. The method of claim 15, further comprising accumulating a digest of all providers of the authorizations via a secure hash algorithm.

18. The method of claim 15, further comprising updating the proof value by replacement of a previous proof value with the updated proof value.

19. The method of claim 15, further comprising receiving a properly signed authorization and extending the final proof value with a public identity of a key used to confirm the authorization.

20. The method of claim 15, further comprising differentiating authorizations based on qualifying data stored in signed data.

* * * * *